United States Patent
Maeda et al.

(10) Patent No.: US 6,652,773 B2
(45) Date of Patent: Nov. 25, 2003

(54) HIGH GEL-CONTENT POLYMER DISPERSED IN A HIGH-BOILING ORGANIC MEDIUM

(75) Inventors: Koichiro Maeda, Yokohama (JP); Toshihiro Inoue, Kamakura (JP); Haruhisa Yamamoto, Yokohama (JP); Keiko Imai, Yokohama (JP)

(73) Assignee: Nippon Zeon Co., Ltd., Tokyo (JP)

( * ) Notice: Subject to any disclaimer, the term of this patent is extended or adjusted under 35 U.S.C. 154(b) by 141 days.

(21) Appl. No.: 09/998,785

(22) Filed: Dec. 3, 2001

(65) Prior Publication Data

US 2002/0068783 A1 Jun. 6, 2002

Related U.S. Application Data

(63) Continuation of application No. 09/269,635, filed as application No. PCT/JP96/02849 on Oct. 1, 1996, now abandoned.

(51) Int. Cl.$^7$ ........................ C08L 101/00; H01M 4/62
(52) U.S. Cl. ................ 252/182; 427/189; 427/190; 427/194; 427/198; 427/217; 524/543
(58) Field of Search ................... 524/543, 561, 524/571; 252/182; 427/189, 190, 194, 198, 217

(56) References Cited

U.S. PATENT DOCUMENTS

| 4,172,319 A | * | 10/1979 | Bloom et al. | 29/623.4 |
|---|---|---|---|---|
| 4,557,974 A | * | 12/1985 | Tsukuda et al. | 428/407 |
| 4,673,703 A | | 6/1987 | Bromley et al. | 524/504 |
| 5,238,977 A | | 8/1993 | Piejko et al. | 523/201 |
| 5,294,503 A | * | 3/1994 | Huang et al. | 429/217 |

FOREIGN PATENT DOCUMENTS

| JP | 4-249860 | 9/1992 |
|---|---|---|
| JP | 4-342966 | 11/1992 |
| JP | 5-21068 | 1/1993 |
| JP | 5-74461 | 3/1993 |
| JP | 5-503549 | 6/1993 |
| JP | 6-503105 | 4/1994 |
| JP | 6-179707 | 6/1994 |
| JP | 6-510553 | 11/1994 |
| JP | 6-511595 | 12/1994 |

* cited by examiner

*Primary Examiner*—Kelechi Egwim
(74) *Attorney, Agent, or Firm*—Armstrong, Westerman & Hattori, LLP

(57) ABSTRACT

A polymer dispersion composition obtained by dispersing an electrode active material and a polymer having a gel content of 50% or more in an organic dispersion medium of which boiling point at 760 mmHg is 80° C. or above. The composition is successfully usable as, for instance, a binder composition for batteries, and the battery produced therefrom is high in initial capacity and small in the drop of capacity.

9 Claims, No Drawings

HIGH GEL-CONTENT POLYMER DISPERSED IN A HIGH-BOILING ORGANIC MEDIUM

This application is a continuation of prior application Ser. No. 09/269,635 filed Mar. 31, 1999, now abandoned, which is a 371 of PCT/JP96/02849 filed Oct. 1, 1996, and which is hereby incorporated by reference.

TECHNICAL FIELD OF THE INVENTION

The present invention relates to a polymer dispersion composition obtained by dispersing a polymer in an organic dispersion medium. The polymer dispersion composition is successfully usable as a binder composition for batteries. Accordingly, the present invention also relates to a slurry composition for batteries using said polymer dispersion composition as a binder composition for batteries, and to an electrode and a battery using the same.

BACKGROUND ART

An elastomer is a soft polymer having rubber elasticity of which glass transition temperature is 30° C. or below. Such elastomers are in use in various fields.

An elastomer is used for forming a uniform film by the procedure of (1) melting, followed by coating, (2) forming a uniform solution by dissolution in an organic solvent, followed by coating, (3) forming a stable dispersion in an aqueous solvent by the use of a surfactant, followed by coating, etc. Although JP-A, 6-179707 proposes a method of dispersing an elastomer in an aqueous or organic solvent without using surfactant, the examples presented in the specification thereof are limited to those using an aqueous solvent, and the films formed by the use of an organic solvent are considered a homogeneous films. Thus, there is known no case of using an elastomer dispersion composition prepared by dispersing an elastomer in an organic dispersion medium for formation of a heterogeneous film having a high gel content or for a general binder.

A battery has positive and negative electrodes as the constituent elements thereof. An electrode is constituted of a variety of elements including an active material participating in electrochemical reaction, an electrode base, electroconductive particles as optional constituents, etc. An electrode is prepared by mixing an active material, etc. with a binder composition, etc. to form a slurry composition for batteries, coating the slurry composition onto an electrode base, and drying it. A slurry composition for batteries is prepared by adding an active material to a binder composition comprising a binder polymer and a solvent or a dispersion medium.

The prior binder compositions for batteries are classified into those of organic solvent type and those of aqueous solvent type. Most of the conventional organic solvent type of binder compositions for batteries are solution type binder compositions prepared by uniformly dissolving polyvinylidene fluoride in N-methylpyrrolidone which is a polar organic solvent (for example, see: JP-A, 4-249860), and there is known no case of using an elastomer dispersion composition prepared by dispersing an elastomer in an organic dispersion medium as a binder composition for batteries.

The prior organic solvent type binder compositions are free from the faults of the aqueous binder compositions mentioned below, because they are of organic solvent type. However, the uniform film formed from the homogeneous solution comes to cover the whole surface of electrode active material, which is undesirable under the present conditions of matters where enhancement of the capacity of battery is desired, because such a uniform film decreases the surface area of active material coming into a direct contact with electrolyte. It is desired to enlarge the proportion of active material contributing to electric capacity of active material, namely to enlarge the surface area of active material coming into contact with electrolyte.

As aqueous binder compositions, there have been proposed those prepared by adding carboxymethyl cellulose as a thickener to an aqueous dispersion of styrene-butadiene copolymer rubber latex prepared by emulsion polymerization using a surfactant (for example, JP-A, 4-342966, JP-A, 5-21068, JP-A, 5-74461, etc.). This type of binder compositions have a problem that, when used in a lithium ion secondary battery or the like, the contact with water causes formation of hydroxyl groups linked to active material surface which can exercise an influence of lowering the initial capacity. Further, there is a problem that, in a non-aqueous battery of lithium type using a non-aqueous electrolyte, the contact with water must be avoided as possible from the viewpoint of improving the efficiency of manufacture, even though the battery manufacturing process may include a drying step.

The present inventors have succeeded in preparing a polymer dispersion composition by dispersing a specified polymer in a specified organic dispersion medium, and have found that the polymer dispersion composition thus obtained can successfully be used as a binder composition for batteries. Based on the finding, the present invention has been accomplished.

DISCLOSURE OF THE INVENTION (Polymer Dispersion Composition)

Accordingly, an object of the present invention is to provide a polymer dispersion composition wherein a specified polymer is dispersed in a specified organic dispersion medium, to use the polymer dispersion composition as, for instance, a binder composition for batteries, to suppress the deteriorating quality of active material caused by water, to make it possible to fix an electrode active material on an electrode in a partially exposed state without coating the whole surface of the electrode active material, and thereby to make small the extent of damage in the function of active material. It is a further object of the invention to fix a large quantity of active material on an electrode base by the use of such a binder composition for batteries and thereby to provide a battery having a high initial capacity and prevent the release of active material from electrode base even after repeated charge and discharge cycle.

BEST EMBODIMENT FOR CARRYING OUT THE INVENTION

Thus, according to the present invention, there are provided a polymer dispersion composition obtained by dispersing a polymer having a gel content of 50% or more in an organic dispersion medium having a boiling point of 80° C. or above at 760 mmHg, a slurry composition for batteries obtained by mixing said composition with an electrode active material, an electrode obtained by coating said slurry composition for batteries onto the surface of a battery base and then removing the organic dispersion medium, and a battery using said electrode.

The organic dispersion medium used in the present invention has a boiling point of 80° C. or above, preferably 100° C. or above, at 760 mmHg. When used as a binder composition for batteries, the organic dispersion medium preferably has a boiling point of 150° C. or below at 760 mmHg and a boiling point of 300° C. or below at 760 mmHg, because it is necessary to dry an electrode base without deterioration thereof. If the boiling point at 760 mmHg is lower then 80° C., the drying progresses too rapidly so that coating of the electrode base is difficult to carry out; and the polymer migrates and is concentrated into the surface of electrode base during the drying step to cause problems such as deterioration of film strength, decrease of binding force between electrode active material particles, etc. These problems arise especially when the organic dispersion medium is an alcohol or a ketone of which boiling point is lower than 80° C., such as ethyl alcohol.

As concrete examples of the organic dispersion medium, there can be referred to a variety of polar and non-polar dispersion mediums including aromatic hydrocarbons such as benzene, toluene, xylene, ethylbenzene and the like; aliphatic hydrocarbons such as heptane, octane, nonane, decane and the like; alicyclic hydrocarbons such as cyclohexane, methylcyclohexane, ethylcyclohexane and the like; ketones such as methyl ethyl ketone, methyl isobutyl ketone, cyclopentanone, cyclohexanone, cycloheptanone and the like; cyclic and acyclic amides such as dimethylformamide, N-methyl-pyrrolidone and the like; alcohols such as butyl alcohol, amyl alcohol, hexyl alcohol and the like; esters such as methyl lactate, ethyl lactate, butyl lactate, butyl acetate, methyl benzoate and the like; etc. In a case where the composition is used as a binder composition for batteries, those having a boiling point of 100 to 250° C. at 760 mmHg are especially preferably selected from cyclic and acyclic amides, ketones, esters and aromatic hydrocarbons because these dispersion mediums are well-balanced between polymer-dispersing performance, easiness of handling, safety, easiness of synthesis, etc.

The polymer used in the present invention is a polymer having a gel content of 50% or more. This polymer is preferably a polymer prepared by using, as the first component monomer, a monomer which gives an elastomer, namely a soft polymer having a rubber elasticity and a Tg of 30° C. or below, when converted to a homopolymer. Of these monomers, conjugated dienes and ethylenically unsaturated carboxylic ester type monomers are preferably used for polymerization. Mechanism of the polymerization is usual radical polymerization or ionic polymerization, and the polymerization reaction may be carried out by any of usual methods such as emulsion polymerization, suspension polymerization, solution polymerization, etc. The polymer used in the present invention may be either a homopolymer of a conjugated diene monomer or an ethylenically unsaturated carboxylic ester type monomer or a copolymer of a conjugated diene monomer and an ethylenically unsaturated carboxylic ester monomer. Owing to the use of these monomer components, the polymer can be given an elastomeric properties as a whole or partially. As used herein, the term "elastomeric properties" means adhesiveness, softness, etc. When the composition is used as a binder composition for electrodes of secondary batteries, especially important properties are adhesiveness to electrode base on electrodes and softness (elongation and permanent elongation) enough to cope with the movement of active material at the time of charge and discharge.

Further, a second component different from the first component may be used. As said second component, ethylenically unsaturated monomers other than the above-mentioned ethylenically unsaturated monomers giving an elastomer when converted to a homopolymer can be used, of which examples include ethylenically unsaturated carboxylic acid monomers, styrene monomers, nitrile group-containing monomers, acrylamide monomers, methacrylamide monomers, glycidyl group-containing monomers, sulfonic acid group-containing monomers, amino group-containing monomers, and the like.

As concrete examples of the conjugated diene monomers used as the first component, 1,3-butadiene, isoprene, 2,3-dimethyl-1,3-butadiene, 1,3-pentadiene, piperylene and the like can be referred to.

As concrete examples of the ethylenically unsaturated carboxylic ester monomers used as the first component, methyl acrylate, ethyl acrylate, propyl acrylate, butyl acrylate, isobutyl acrylate, n-amyl acrylate, isoamyl acrylate, n-hexyl acrylate, 2-ethylhexyl acrylate, n-octyl acrylate, 2-hydroxyethyl acrylate, hydroxypropyl acrylate, propyl methacrylate, butyl methacrylate, isobutyl methacrylate, n-amyl methacrylate, isoamyl methacrylate, n-hexyl methacrylate, 2-ethylhexyl methacrylate, n-octyl methacrylate, 2-hydroxyethyl methacrylate, hydroxypropyl methacrylate, lauryl acrylate, lauryl methacrylate, methyl crotonate, ethyl crotonate, ethyl isocrotonate and the like can be referred to.

The second component is as follows. (1) As concrete examples of the ethylenically unsaturated carboxylic acid monomer, ethylenically unsaturated carboxylic ester monomers giving no elastomer when converted to a homopolymer such as methyl methacrylate and ethyl methacrylate; unsaturated monocarboxylic acid monomers such as acrylic acid, methacrylic acid and the like; unsaturated dicarboxylic acid monomers such as maleic acid, fumaric acid, citraconic acid, methaconic acid, glutaconic acid, itaconic acid, tetrahydrophthalic acid, crotonic acid, isocrotonic acid, nadic acid and the like; and monoesters of ethylenically unsaturated carboxylic acids such as monooctyl maleate, monobutyl maleate, monooctyl itaconate and the like can be referred to. (2) As concrete examples of the styrene monomers, styrene, α-methylstyrene, β-methylstyrene, p-t-butylstyrene, chlorostyrene and the like can be referred to. (3) As concrete examples of the nitrile group-containing monomers, acrylonitrile and methacrylonitrile can be referred to. (4) As concrete examples of the acrylamide type monomers, acrylamide, N-methylolacrylamide, N-butoxymethylacrylamide and the like can be referred to. (5) As concrete examples of the methacrylamide type monomers, methacrylamide, N-methylolmethacrylamide, N-butoxymethylmethacrylamide and the like can be referred to. (6) As concrete examples of the glycidyl group-containing monomers, glycidyl acrylate, glycidyl methacrylate, allyl glycidyl ether and the like can be referred to. (7) As concrete examples of the sulfonic acid group-containing monomers, sodium styrene-sulfonate, acrylamidomethylpropane-sulfonic acid and the like can be referred to. (8) As concrete examples of the amino group-containing monomers, dimethylaminoethyl methacrylate, diethylamino-ethyl methacrylate and the like can be referred to.

As the second component, ethylenically unsaturated carboxylic acid type monomers, styrene type monomers and nitrile group-containing monomers are preferred.

In cases where a second component is used, the proportion thereof is usually from 1:0.1 to 1:10 and preferably from 1:0.5 to 1:5, as expressed in terms of ratio (by weight) of the first component to the second component.

The use of a second component is desirable because the binding force between a binder composition for batteries and a metal constituting an electrode base can be enhanced by its use. Further, if an unsaturated dicarboxylic acid type monomer or a nitrile group-containing monomer is used, polymer becomes easier to disperse when N-methylpyrrolidone or the like is used as an organic dispersion medium. The proportion of the unsaturated dicarboxylic acid type monomer or nitrile group-containing monomer is not smaller than 5% by weight, preferably not smaller than 10% by weight, and not larger than 90% by weight, preferably not larger than 60% by weight and further preferably not larger than 30% by weight, based on the total monomers. Since the use of an excessively large amount of the second component causes deterioration of the softness of polymer, such a binder composition for batteries can make the electrode active material easily releasable.

As concrete examples of such a polymer, there can be referred to homopolymers and copolymers of conjugated diene monomers, copolymers of a conjugated diene monomer and an ethylenically unsaturated carboxylic ester type monomer, homopolymers and copolymers of ethylenically unsaturated carboxylic ester type monomer, copolymers obtained by using a conjugated diene monomer and an ethylenically unsaturated carboxylic ester type monomer as first components and a styrene type monomer as a second component, copolymers obtained by using a conjugated diene monomer and an ethylenically unsaturated carboxylic ester type monomer as first components and an unsaturated dicarboxylic acid type monomer and a styrene type monomer as second components, copolymers obtained by using a conjugated diene monomer and an ethylenically unsaturated carboxylic ester type monomer as first components and an unsaturated dicarboxylic acid type monomer, a styrene type monomer and a nitrile group-containing monomer as second components, and copolymers obtained by using an ethylenically unsaturated carboxylic ester type monomer as first component and an unsaturated carboxylic acid monomer, an unsaturated carboxylic ester type monomer and a styrene type monomer as second components, etc. More specifically saying, examples of such a polymer include polybutadiene, polyisoprene, styrene-butadiene copolymer, styrene-isoprene copolymer, styrene-butadiene-methyl methacrylate copolymer, styrene-acrylonitrile-butadiene copolymer, styrene-acrylonitrile-butadiene-methyl methacrylate copolymer, styrene-acrylonitrile-butadiene-methyl methacrylate-itaconic acid copolymer, styrene-acrylonitrile-butadiene-methyl methacrylate-fumaric acid copolymer, polystyrene-polybutadiene block copolymer, and the like.

Of these polymers, preferred are those prepared by using butadiene as the conjugated diene monomer, butyl acrylate as the ethylenically unsaturated carboxylic ester type monomer, acrylic acid as the unsaturated monocarboxylic acid monomer, itaconic acid or fumaric acid as the unsaturated dicarboxylic acid monomer, methyl methacrylate as the unsaturated carboxylic ester type monomer, styrene as the styrene type monomer, and acrylonitrile as the nitrile group-containing monomer.

The polymer used in the present invention has a form of particle which can be dispersed in a dispersion medium. Particle diameter thereof, determined by vaporizing off the dispersion medium, thereafter measuring major and minor diameters of 100 particles by means of electron microscope and calculating a mean value thereof, is usually from 0.005 to 100 $\mu$m and preferably from 0.01 to 50 $\mu$m. If the particle diameter is too large, the composition using such a polymer as a binder composition for batteries is insufficient in contact with electrode active material, due to which the inner resistance of electrode increases. If the particle diameter is too small, an excessively large quantity of binder must be used, due to which the surface of active material is covered with the binder.

Gel content of the polymer used in the present invention is usually 50% or more, preferably 75% or more, and further preferably 80% or more. In the present invention, gel content is expressed by toluene-insoluble fraction, which is determined by drying about 1 g of polymer at 100° C. for 24 hours, measuring the weight in dryness, dipping the dry polymer in toluene for 24 hours at ambient temperature of 25° C., sifting the polymer through a 200 mesh sieve, drying the solid remaining on the sieve, measuring the weight of dry polymer, and calculating the gel content according to the following formula:

(weight of dry solid remaining on the sieve/weight of dry polymer)×100

A gel content represents the extent of cross-linking of a polymer. A polymer having a gel content smaller than 50% is undesirable, because such a polymer is soluble in organic dispersion medium and, when used as a binder composition for batteries, such a polymer coated on an electrode base spreads and covers the surface of active material and thereby decreases the contribution of active material to the electric capacity.

Cross-linking is usually necessary for gelation of the polymer mentioned above. The cross-linking may be a self-crosslinking caused by heat, light, radiation, electron beam or the like, or may also be a cross-linked structure introduced by the use of a cross-linking agent. Combination of these two modes of cross-linking may also be adopted.

As examples of the cross-linking agent, there can be referred to various cross-linking monomers including peroxide type cross-linking agents such as benzoyl peroxide, dichlorobenzoyl peroxide, dicumyl peroxide, di-tert-butyl peroxide, 2,5-dimethyl-2,5-di(peroxidobenzoato)hexyne-3, 1,4-bis(tert-butylperoxyisopropyl)benzene, lauroyl peroxide, tert-butyl peracetate, 2,5-dimethyl-2,5-di(tert-butylperoxy)hexyne-3,2,5-trimethyl-2,5-di(tert-butylperoxy)hexane, tert-butylperbenzoate, tert-butyl perphenylacetate, tert-butyl perisobutyrate, tert-butyl per-sec-octoate, tert-butyl perpivalate, cumyl perpivalate, tert-butyl perdiethylacetate and the like; azo compounds such as azobisisobutyronitrile, dimethyl azoisobutyrate and the like; dimethacrylate compounds such as ethylene diglycol dimethacrylate, diethylene diglycol dimethacrylate and the like; trimethacrylate compounds such as trimethylolpropane trimethacrylate and the like; diacrylate compounds such as polyethylene-glycol diacrylate, 1,3-butyleneglycol diacrylate and the like; triacrylate compounds such as trimethylolpropane triacrylate and the like; divinyl compounds such as divinylbenzene and the like; etc. Of these cross-linking agents, preferred are dimethacrylate compounds such as ethylene diglycol dimethacrylate and the like and divinyl compounds such as divinylbenzene and the like.

When a lumpy polymer of cross-linked structure is formed, such a material may be put to use after cooling it to a temperature lower than Tg, followed by pulverizing by means of jet mill.

The polymer dispersion composition of the present invention is obtained by, for example, preparing an aqueous dispersion of a polymer in an aqueous dispersion medium and then exchanging the dispersion medium from the aqueous dispersion medium to an organic dispersion medium. When this method is adopted, the water must be removed. In cases where boiling point of the organic dispersion medium used is higher than boiling point of water, an organic dispersion medium is added and thereafter water is evaporated off by the use of an evaporator or the like. In cases where the organic dispersion medium is a material capable of forming an azeotropic mixture with water, the organic dispersion medium is added and then the quantity of water is decreased to some extent by azeotropic distillation using an evaporator or the like, and thereafter the residual water is removed by the use of a water-absorbent such as molecular sieve or by means of reverse osmotic membrane.

As another method for producing the polymer dispersion composition of the present invention, there can be referred to a method of producing a polymer in an aqueous dispersion medium, coagulating, drying and pulverizing the polymer dispersion thus formed, and dispersing the pulverized polymer in an organic dispersion medium, and a method of producing a polymer in an aqueous dispersion medium, coagulating and drying the polymer thus formed, mixing the polymer with an organic dispersion medium, and then pulverizing the mixture. The dispersing treatment can be achieved with conventional dispersing machines such as ball mill and sand mill, or with ultrasonic dispersing machine, homogenizer, or the like.

In a case where a polymer is produced in an organic dispersion medium and the polymer thus formed is a lumpy material, a polymer dispersion composition dispersed in the organic dispersion medium can be obtained by pulverizing the lumpy polymer by means of ball mill, sand mill or the like.

(Binder Composition for Batteries)

A variety of additives may be added to the polymer dispersion composition of the present invention according to the use thereof.

For instance, the polymer dispersion composition is successfully usable as a binder composition for batteries. When the composition of the present invention is put to such a use, a viscosity regulator may be additionally added for the purpose of facilitating the procedure for obtaining a coating film of desired thickness. As the viscosity regulator, there can be used polyvinylpyrrolidone, polyacrylic acid, polymethacrylic acid, polyacrylamide, poly-N-isopropylacrylamide, poly-N,N-dimethylacrylamide, polyethyleneimine, polyoxyethylene, poly(2-methoxyethoxyethylene), polyvinyl alcohol, poly(3-morpholinylethylene), polyvinylsulfonic acid, polyvinylidene fluoride, polysaccharides such as amylose, amylopectin, starch and the like and cellulosic compounds such as carboxymethyl cellulose, hydroxyethyl cellulose, hydroxypropyl cellulose, carboxyethyl methyl cellulose and the like.

When the composition of the present invention is used as a binder composition for batteries, concentration of the polymer dispersed in the organic dispersion medium is from 0.1 to 70% by weight, preferably from 1 to 60% by weight, and further preferably from 2 to 50% by weight. If concentration of the polymer is too low, the slurry composition for batteries prepared therefrom is difficult to adjust to a concentration at which the composition can easily be coated onto electrode base. If concentration of the polymer is too high, the polymer tends to agglomerate in the organic dispersion medium.

(Slurry Composition for Batteries)

A slurry composition for batteries of the present invention is prepared by adding an electrode active material to the binder composition for batteries mentioned above.

As the active material, those used in the usual batteries can be used. For instance, in the case of lithium battery, carbon fluoride, graphite, natural graphite, PAN type carbon fibers such as MCMB and the like, carbonaceous materials such as pitch type carbon fiber and the like, electrically conductive polymers such as polyacene and the like, lithium nitride compounds such as $Li_3N$ and the like, lithium type metallic materials such as lithium metal, lithium alloy and the like, metallic compounds such as $TiS_2$, $LiTiS_2$ and the like, metallic oxides such as $Nb_2O_5$, $FeO$, $Fe_2O_5$, $Fe_3O_4$, $CoO$, $Co_2O_3$, $Co_3O_4$ and the like, and composite metallic oxides represented by $A_xM_yN_zO_2$ wherein A is Li, M is at least one member selected from the group consisting of Co, Ni and Mn, N is at least one member selected from the group consisting of Al and Sn, O is oxygen atom, and X, y and z are numerical figures satisfying the following formulas:

$$1.10 \geq x \geq 0.05$$

$$4.00 \geq y \geq 0.85$$

and $$2.00 \geq z \geq 0$$

can be used as a negative electrode active material; and inorganic compounds such as oxides, sulfides and selenides of manganese, molybdenum, vanadium, titanium, niobium and the like, lithium-containing composite oxides such as lithium manganese oxide, lithium cobalt oxide, lithium nickel oxide, lithium iron oxide and the like, $TiS_2$, $TiS_3$, amorphous $MoS_3$, $Cu_2V_2O_3$, amorphous $V_2O_5$—$P_2O_5$, $MoO_3$, $V_2O_5$, $V_6O_{13}$, composite metallic oxides represented by $A_xM_yN_zO_p$ wherein A is Li, M is at least one member selected from the group consisting of Co, Ni and Mn, N is at least one member selected from the group consisting of Al and Sn, O is oxygen atom, and x, y, z and p are numerical figures satisfying the following formulas:

$$1.10 \geq x \geq 0.05$$

$$4.00 \geq y \geq 0.85$$

$$2.00 \geq z \geq 0,$$

and $$5.00 \geq p \geq 1.5,$$

electrically conductive polymers such as polyacetylene, poly-p-phenylene and the like, etc. can be used as the positive electrode active material.

Although the amount of active material in the slurry composition for batteries is not particularly limited, the active material is added in an amount of usually 1 to 1,000 times, preferably 5 to 1,000 times, further preferably 10 to 1,000 times, and especially preferably 15 to 100 times as much as the amount of the polymer, all by weight. If the amount of the active material is too small, many inactive portions are formed in the active material layer on the electrode base, which makes the function of electrode insufficient. If the amount of the active material is too large, the active material cannot be sufficiently fixed onto the electrode base and is readily releasable. If desired, an organic dispersion medium may be added to the slurry composition for batteries for the purpose of adjusting the slurry to a concentration at which the composition can easily be coated onto the electrode base.

(Electrode)

An electrode of the present invention is obtained by coating the slurry composition for batteries mentioned above onto an electrode base and removing the organic dispersion medium, by which the active material is immobilized in the matrix thus formed on the electrode base surface.

Although the electrode base is not particularly limited in material so far as it is made of an electrically conductive material, it is usually made of a metal such as iron, copper, aluminum or the like. Although the shape thereof is not particularly limited, the electrode base usually has a sheet-like shape having a thickness of about 0.01 to 0.5 mm.

The method for coating the slurry composition for batteries onto the electrode base is not particularly limited. For instance, the slurry composition can be coated by the method of dipping, brushing, etc. Although the quantity of the slurry composition for batteries to be coated is not particularly limited, it is such a quantity that thickness of the active material layer formed after removing the organic dispersion medium becomes 0.01 to 5 mm and preferably 0.1 to 2 mm. Although the method for removing the organic dispersion medium is not particularly limited, the organic dispersion medium is usually removed while controlling the extents of evacuation and heating so as to vaporize the organic dispersion medium as speedily as possible within a speed range where no crack is formed in active material layer due to concentrated stress and no peeling of active material layer from electrode base takes place.

(Battery)

In the battery of the present invention, the above-mentioned electrode is used as at least one of positive electrode and negative electrode. Although the battery may be any of a battery using an aqueous electrolytic solution and a battery using a non-aqueous electrolytic solution, an especially excellent battery performance can be exhibited when the electrode is used for a battery using a non-aqueous electrolytic solution. As batteries using non-aqueous electrolytic solution, there can be referred to lithium type batteries such as lithium primary battery, lithium metal secondary battery, lithium ion secondary battery, lithium polymer secondary battery, lithium ion polymer secondary battery and the like.

The electrolytic solution in the lithium type battery is not particularly limited, but those exhibiting a battery performance may be selected in accordance with the kinds of negative electrode active material and positive electrode active material. For instance, as the electrolyte, the electrolytes conventionally used in lithium batteries such as $LiClO_4$, $LiBF_4$, $CF_3SO_3Li$, $LiI$, $LiAlCl_4$, $LiPF_6$ and the like can be referred to. As solvent for the electrolyte, ethers, ketones, lactones, nitriles, amines, amides, sulfur compounds, chlorinated hydrocarbons, esters, carbonates, nitro compounds, phosphoric ester compounds, sulfolane compounds and the like can be referred to. Of these solvents, carbonates such as ethylene carbonate and diethyl carbonate are suitably usable generally.

EXAMPLES

Next, the present invention is explained with reference to examples. The present invention is by no means limited by these examples.

In the Examples and Comparative Examples, gel content, particle diameter and viscosity were measured by the following methods or by means of the following devices.

(1) Gel Content

About one gram of a polymer was dried at 100° C. for 24 hours and the weight in dryness was measured. Then, the polymer was dipped in toluene for 24 hours at an ambient temperature of 25° C. and sifted through a 200 mesh sieve, and the solid material remaining on the sieve was dried and weighed, from which gel content was calculated according to the following formula:

(weight of dry solid material remaining on sieve/weight of dry polymer)×100

(2) Particle Diameter

After drying and removing the organic dispersion medium, major and minor diameters of 100 particles were measured by means of a transmission type electron microscope, from which a mean value was calculated.

(3) Viscosity

Viscosity was measured at 25° C. with B viscometer.

Example 1

One liter of water, 800 g of styrene, 600 g of butadiene, 400 g of methyl methacrylate, 100 g of acrylonitrile, 50 g of itaconic acid, 4 g of ammonium lauryl sulfate and 10 g of sodium carbonate were charged into an autoclave equipped with a stirrer, and a monomer emulsion was prepared therefrom.

Subsequently, 3.4 liters of water, 10 g of ethylenediamine tetraacetate, 10 g of ammonium lauryl sulfate, 20 g of potassium persulfate and 10% by volume of the monomer emulsion obtained above were charged into an autoclave equipped with a stirrer, heated to 80° C. and made to react for one hour with stirring. Subsequently, 80 g of potassium persulfate was added together with 200 ml of water. While keeping the temperature at 80° C. and continuing the stirring, the residual portion of the monomer emulsion was added. While keeping the temperature at 80° C. and continuing the stirring, the reaction was made to progress for an additional 4 hours to obtain a semi-opaque latex in a yield of 99%. The polymer particles dispersed in the latex had a mean particle diameter of 0.14 μm. Gel content of the polymer was 95%.

From the latex, the unreacted residual monomer was removed by steam distillation, and pH value was adjusted to 7 with lithium hydroxide. Then, N-methylpyrrolidone having a boiling point of 204° C. (its amount was three times the total weight) was added, and water was vaporized off by means of an evaporator to obtain Binder Composition A of which solid component concentration was 37% by weight.

To a half quantity of the Binder Composition A was added carbon (KS-15 manufactured by LONZA G+T Ltd.) as a negative electrode active material in an amount of 20 times the weight of solid component in Binder Composition A. Then, N-methylpyrrolidone was added in an amount enough to give a viscosity at 25° C. of 3,000 cps. Thus, a slurry composition for negative electrode was obtained.

The slurry composition for negative electrode was coated on one side of a copper foil of 0.1 mm thick and allowed to stand at 120° C. for 3 hours to form a negative electrode active material layer having a thickness of 0.4 mm. Thus, a negative electrode was obtained.

On the other hand, to the remainder of the Binder Composition A was added a mixture of 90 parts by weight of $LiCoO_2$ as a positive electrode active material and 10 parts by weight of acetylene black, in an amount of 20 times the weight of the solid component in Binder Composition A. Further, N-methylpyrrolidone was added in an amount enough to give a viscosity at 25° C. of about 2,000 cps. Thus, a slurry composition for positive electrode was obtained.

The slurry composition for positive electrode thus obtained was coated onto one side of an aluminum foil of 0.2 mm thick and allowed to stand at 120° C. for 3 hours to form a positive electrode active material layer having a thickness of 0.4 mm. Thus, a positive electrode was obtained.

The positive and negative electrodes obtained above were cut into circles each having a diameter of 15 mm. The circles thus obtained were superposed through intermediation of a circular micro-porous film (made of an unwoven fiber polypropylene cloth) having a diameter of 16 mm and a thickness of 50 μm as a separator, so that the active material layers thereof confront each other, and the whole was introduced into a stainless steel-made coin-form container having a diameter of 20 mm, a height of 1.8 mm and a stainless steel layer thickness of 0.2 mm, and provided with polypropylene packings.

Into the container was injected, as an electrolytic solution, a solution prepared by dissolving 1 mol/liter of $LiPF_6$ in 1:1 (by volume) mixture of ethylene carbonate and diethyl carbonate, so that no air was left unremoved. A stainless steel-made cap of 0.2 mm thick was put on the container through intermediation of the polypropylene-made packing, and the exterior container and the cap were fixed, and the whole was sealed so that the cap came into contact with the copper foil and bottom of the exterior container came into contact with aluminum foil. Thus, a coin-form battery having a diameter of 20 mm and a thickness of 2.0 mm was obtained.

The battery thus obtained was charged up to 4.2 V by the constant current method at a current density of 0.1 $mA/cm^2$, and then discharged down to 3.2 V. This charging-discharging treatment was repeated, and the change in electric capacity was measured.

The electric capacity was 19.6 mAh in the first charge, 19.2 mAh in the 10th charge (about 98% of that in the first charge), 17.8 mAh in the 50th charge (about 91% of that in the first charge), and 17.5 mAh in the 200th charge (about 89% of that in the first charge).

Example 2

A semi-opaque latex was prepared in a yield of 99% in the same manner as in Example 1, except that 1,000 g of styrene, 500 g of butadiene, 300 g of methyl methacrylate and 100 g of acrylonitrile were used as monomer components. The polymer dispersed in the latex had a mean particle diameter of 0.15 μm. Gel content of the polymer was 92%.

The latex was subjected to a dispersion medium-replacing treatment in the same manner as in Example 1 to obtain Binder Composition B having a solid component concentration of 40% by weight.

Using the Binder Composition B, a battery was prepared in the same manner as in Example 1, and charging and discharging thereof were repeated. Electric capacity was 19.0 mAh in the first charge, 18.7 mAh in the 10th charge (about 98% of that in the first charge), 17.2 mAh in the 50th charge (about 91% of that in the first charge), and 16.8 mAh in the 200th charge (about 88% of that in the first charge).

Example 3

A semi-opaque latex was prepared in a yield of 99% in the same manner as in Example 1, except that 700 g of styrene, 400 g of butadiene, 400 g of methyl methacrylate, 200 g of acrylonitrile, 200 g of itaonic acid and 10 g of fumaric acid were used as monomer components. The polymer dispersed in the latex had a mean particle diameter of 0.14 μm. Gel content of the polymer was 95%.

The latex was subjected to a dispersion medium-replacing treatment in the same manner as in Example 1 to obtain Binder Composition C. having a solid component concentration of 42% by weight.

Using the Binder Composition C, a battery was prepared in the same manner as in Example 1, and charging and discharging thereof were repeated. Electric capacity was 18.6 mAh in the first charge, 17.4 mAh in the 50th charge (about 94% of that in the first charge), and 17.0 mAh in the 200th charge (about 91% of that in the first charge).

Example 4

A semi-opaque latex was prepared in the same manner as in Example 1, except that 800 g of styrene, 500 g of butadiene, 400 g of methyl methacrylate, 100 g of acrylonitrile and 100 g of itaconic acid were used as monomer components. The polymer dispersed in the latex had a mean particle diameter of 0.2 μm. Gel content of the polymer was 98%.

The latex was subjected to a dispersion medium-replacing treatment in the same manner as in Example 1, except that N-methylpyrrolidone was used in an amount of 10 times the total weight, to obtain Binder Composition D having a solid component concentration of 7% by weight.

Using the Binder Composition D, a battery was prepared in the same manner as in Example 1, and charging and discharging thereof were repeated. Electric capacity was 20.0 mAh in the first charge, 19.0 mAh in the 50th charge (about 95% of that in the first charge), and 18.6 mAh in the 200th charge (about 93% of that in the first charge).

Example 5

A semi-opaque latex was prepared in the same manner as in Example 1, except that 800 g of styrene, 600 g of butadiene, 400 g of methyl methacrylate, 100 g of acrylonitrile and 50 g of itaconic acid were used as monomer components. The polymer dispersed in the latex had a mean particle diameter of 0.14 μm. Gel content of the polymer was 96%.

The latex was subjected to a dispersion medium-replacing treatment in the same manner as in Example 1, except that the amount of N-methylpyrrolidone was 10 times the total weight, to obtain Binder Composition E having a solid component concentration of 6% by weight.

Using the Binder Composition E, a battery was prepared in the same manner as in Example 1, and charging and discharging thereof were repeated. Electric capacity was 19.8 mAh in the first charge, 18.4 mAh in the 50th charge (about 93% of that in the first charge), and 17.8 mAh in the 200th charge (about 90% of that in the first charge).

Example 6

A semi-opaque latex was prepared in the same manner as in Example 1, except that 800 g of styrene, 600 g of butadiene and 20 g of methyl methacrylate were used as monomer components. The polymer dispersed in the latex had a mean particle diameter of 0.12 μm. Gel content of the polymer was 89%.

The latex was subjected to a dispersion medium-replacing treatment in the same manner as in Example 1, except that benzene having a boiling point 80.1° C. (the amount of benzene was 10 times the total weight) was used in place of the N-methylpyrrolidone, to obtain Binder Composition F having a solid component concentration of 11% by weight.

Using the Binder Composition F, a battery was prepared in the same manner as in Example 1, and charging and discharging thereof were repeated. Electric capacity was 19.5 mAh in the first charge, 18.6 mAh in the 50th charge (about 95% of that in the first charge), and 17.9 mAh in the 200th charge (about 92% of that in the first charge).

Example 7

A semi-opaque latex was prepared in the same manner as in Example 1, except that 800 g of styrene, 150 g of butadiene and 600 g of methyl methacrylate were used as monomer components and 40 g of divinylbenzene was added as a cross-linking agent. The polymer dispersed in the latex had a mean particle diameter of 0.25 μm. Gel content of the polymer was 95%.

The latex was subjected to a dispersion medium-replacing treatment in the same manner as in Example 1, except that N-methylpyrrolidone was used in an amount of 8 times the total weight, to obtain Binder Composition G having a solid component concentration of 21% by weight.

Using the Binder Composition G, a battery was prepared in the same manner as in Example 1, and charging and discharging thereof were repeated. Electric capacity was 19.1 mAh in the first charge, 17.8 mAh in the 50th charge (about 93% of that in the first charge), and 17.2 mAh in the 200th charge (about 90% of that in the first charge).

Example 8

A semi-opaque latex was prepared in the same manner as in Example 1, except that 800 g of styrene, 600 g of butadiene, 400 g of methyl methacrylate, 100 g of acrylonitrile and 50 g of itaconic acid were used as monomer components. The polymer dispersed in the latex had a mean particle diameter of 0.14 μm. Gel content of the polymer was 95%.

The latex was subjected to a dispersion medium-replacing treatment in the same manner as in Example 1, except that methyl lactate having a boiling point of 145° C. (the amount of the methyl lactate was 8 times the total weight) was used in place of N-methylpyrrolidone, to obtain Binder Composition H having a solid component concentration of 29% by weight.

Using the Binder Composition H, a battery was prepared in the same manner as in Example 1, and charging and discharging thereof were repeated. Electric capacity was 19.4 mAh in the first charge, 19.4 mAh in the 10th charge (100% of that in the first charge), 18.1 mAh in the 50th charge (about 93% of that in the first charge), and 17.4 mAh in the 200th charge (about 90% of that in the first charge).

Example 9

A semi-opaque latex was prepared in the same manner as in Example 1, except that styrene only was used in an amount of 600 g as monomer component in place of using the methyl methacrylate, itaconic acid, styrene and acrylonitrile and the reaction temperature was altered to 80° C. and the reaction time was altered to 16 hours. The polymer dispersed in the latex had a mean particle diameter of 0.20 μm. Gel content of the polymer was 99%.

The latex was subjected to a dispersion medium-replacing treatment in the same manner as in Example 1, except that methyl lactate having a boiling point of 145° C. (the amount of the methyl lactate was 8 times the total weight) was used in place of N-methylpyrrolidone, to obtain-Binder Composition I having a solid component concentration of 15% by weight.

Using the Binder Composition I, a battery was prepared in the same manner as in Example 1, and charging and discharging thereof were repeated. Electric capacity was 22.2 mAh in the first charge, 22.0 mAh in the 10th charge (about 98% of that in the first charge), 21.1 mAh in the 50th charge (about 95% of that in the first charge), and 20.1 mAh in the 200th charge (about 91% of that in the first charge).

Comparative Example 1

Aqueous Binder Composition J having a solid component concentration of 45% by weight was prepared in the same manner as in Example 1, except that the dispersion medium replacement using N-methylpyrrolidone was not carried out and the evaporation of water using an evaporator was not carried out.

That is, 1 liter of water, 800 g of styrene, 600 g of butadiene, 400 g of methyl methacrylate, 100 g of acrylonitrile, 50 g of itaconic acid and 10 g of ammonium lauryl sulfate were introduced into an autoclave equipped with a stirrer, and a monomer emulsion was prepared. Subsequently, 3.4 liters of water, 10 g of ethylenediamine tetraacetate, 10 g of ammonium lauryl sulfate, 20 g of potassium persulfate and 10% by volume of the monomer emulsion obtained above were charged into an autoclave equipped with a stirrer and heated to 80° C. and made to react for one hour with stirring. Then, 80 g of potassium persulfate was added together with 200 ml of water. Then, while keeping the temperature at 80° C. and continuing the stirring, all the residual quantity of monomer emulsion was added. While keeping the temperature at 80° C. and continuing the stirring, the reaction was continued for an additional 4 hours to obtain a semi-opaque latex. The polymer thus formed had a mean particle diameter of 0.14 μm. The unreacted residual monomer was removed from the latex by steam distillation, and pH value was adjusted to 7 with lithium hydroxide to obtain Aqueous Binder Composition J.

To a half quantity of the binder composition was added carbon (KS-15 manufactured by LONZA G+T Ltd.) as a negative electrode active material in an amount of 20 times the weight of solid component in the binder composition. Thus, a slurry composition for negative electrode having a viscosity of about 8,000 cps at 25° C. was obtained.

The slurry composition for negative electrode was coated on one side of a copper foil of 0.1 mm thick, and dried at 110° C. for 3 hours to form a negative electrode active material layer having a thickness of 0.4 mm. Thus, a negative electrode was obtained.

On the other hand, a mixture of 90 parts by weight of $LiCoO_2$ as a positive electrode material and 10 parts by weight of acetylene black was added to the residual portion of the binder composition in an amount of 20 times the weight of the solid component in the binder composition, and water was added to adjust the viscosity to about 400 cps at 25° C. Thus, a slurry composition for positive electrode was obtained.

The slurry composition for positive electrode was coated on one side of an aluminum foil of 0.2 mm thick and allowed to stand at 110° C. for 3 hours to form a positive electrode active material layer having a thickness of 0.4 mm. Thus, a positive electrode was obtained.

Using the positive and negative electrodes obtained above, a coin-form battery was prepared in the same manner as in Example 1. The battery was charged up to 4.2 V by the constant current method (electric current: 0.1 mA/cm$^2$) and then discharged down to 3.2 V. While repeating this cycle, the change in electric capacity was measured.

The electric capacity was 17.4 mAh in the first charge, 16.2 mAh in the 10th charge (about 93% of that in the first charge), 15.9 mAh in the 50th charge (about 91% of that in the first charge), and 14.8 mAh in the 200th charge (about 85% of that in the first charge).

Comparative Example 2

Aqueous Binder Composition K was prepared in the same manner as in Comparative Example 1, except that 800 g of styrene, 600 g of butadiene, 100 g of acrylo-nitrile and 50 g of itaconic acid were used as monomer components and 40 g of divinylbenzene was used as a crosslinking agent. Solid component concentration of the composition was 33% by weight and mean particle diameter of the polymer was 0.21 µm.

Using the Aqueous Binder Composition K, a coin-form battery was prepared in the same manner as in Comparative Example 1, and the battery was charged up to 4.2 V by the constant current method (electric current density: 0.1 mA/cm$^2$) and discharged down to 3.2 V. This cycle was repeated, and the change in electric capacity was measured.

The electric capacity was 17.2 mAh in the first charge, 14.5 mAh in the 50th charge (about 84% of that in the first charge), and 12.2 mAh in the 200th charge (about 71% of that in the first charge).

Comparative Example 3

An organic dispersion medium type binder composition L was prepared in the same manner as in Example 1, except that dispersion medium replacement was carried out by using ethanol (boiling point 79° C.) in place of N-methylpyrrolidone. The polymer in the composition had a mean particle diameter of 0.14 µm.

Using the organic dispersion medium type binder composition L, a coin-form battery was tentatively prepared. However, no electrode could be formed.

Comparative Example 4

An electrode was prepared and evaluated in the same manner as in Comparative Example 1, except that a slurry composition for negative electrode having a viscosity of about 3,000 cps was prepared by additionally adding water at the time of adding carbon to Binder Composition J of Comparative Example 1 and the temperature of drying in the preparation of electrode was altered to 120° C.

The electric capacity was 16.9 mAh in the first charge, 15.8 mAh in the 10th charge (about 99% of that in the first charge), 15.4 mAh in the 50th charge (about 91% of that in the first charge), and 14.2 mAh in the 200th charge (about 84% of that in the first charge).

Example 10

A liquid mixture consisting of 20 parts by weight of styrene, 10 parts by weight of methyl methacrylate, 50 parts by weight of n-butyl acrylate, 5 parts by weight of acrylic acid, 3 parts by weight of ethyleneglycol dimethacrylate, 1,200 parts by weight of deionized water, 1 part by weight of dodecylbenzene-sulfonic acid and 2 parts by weight of α,α'-azobisisobutyronitrile was prepared. The mixture thus obtained was treated in TK homomixer (1,200 rpm) for 10 minutes, introduced into a reaction vessel equipped with a stirrer, and reacted at 80° C. for 6 hours. The emulsion thus formed was allowed to cool and taken out from the reaction vessel, the supernatant liquid was separated and removed by centrifugation, and the solid material was dried at 50° C. for 24 hours in vacuum. Fifteen parts by weight of the lumpy agglomerate thus obtained was mixed with 85 parts by weight of ethylcyclohexane having a boiling point of 130–132° C., and pulverized by means of a pigment dispersing machine to obtain Binder Composition N having a solid component concentration of 15% by weight. The polymer obtained by the pulverization had a mean particle diameter of 0.3 µm. Gel content of the polymer was 80%.

The Binder Composition N containing the pulverized particles was added to 100 parts by weight of battery carbon (SFG 66 manufactured by LONZA G+T Ltd.) so that the amount of the pulverized solid particles came to 10 parts by weight. Then, viscosity was adjusted to about 1,000 cps by adding ethylcyclohexane, and the whole was dispersed and homogenized by means of homogenizer to obtain a slurry composition for negative electrode. The slurry composition for negative electrode was coated onto a copper foil by the use of an applicator having a gap of 50 µm, dried, and pressed by means of a roll press to obtain an electrode sheet.

A battery was prepared in the same manner as in Example 1, except that the electrode sheet obtained above was used as a negative electrode, and charging and discharging thereof were repeated. The electric capacity was 17.8 mAh in the first charge, and 17.3 mAh in the 10th charge (about 97% of that in the first charge).

Example 11

Binder Composition O having a solid component concentration of 15% by weight was prepared in the same manner as in Example 9, except that 20 parts by weight of styrene, 10 parts by weight of methyl methacrylate, 30 parts by weight of n-butyl acrylate and 5 parts by weight of acrylic acid were used as monomer components, 3 parts by weight of ethyleneglycol dimethacrylate and 13 parts by weight of divinylbenzene were used as crosslinking agents, and N-methylpyrrolidone was used as a dispersion medium. The polymer in the Binder Composition O had a mean particle diameter of 0.3 µm and a gel content of 85%.

Using the Binder Composition O, a battery was prepared in the same manner as in Example 10, except that Binder Composition O was added to battery carbon so that the amount of polymer particle (solid) came to 5 parts by weight and the amount of ethyl cellulose came to 5 parts by weight per 100 parts by weight of battery carbon, and charging and discharging of the battery were repeated. The electric capacity in the first charge was 22.8 mAh, and 22.3 mAh in the 10th charge (about 98% of that in the first charge).

Example 12

Binder Composition P having a solid component concentration of 28% by weight was prepared in the same manner as in Example 10, except that 20 parts by weight of styrene, 10 parts by weight of methyl methacrylate, 80 parts by weight of n-butyl acrylate and 5 parts by weight of acrylic acid were used as monomer components and 3 parts by weight of ethyleneglycol dimethacrylate and 13 parts by weight of divinylbenzene were used as crosslinking agents. The polymer in the Binder Composition P had a mean particle diameter of 0.45 µm and a gel content of 88%.

Using the Binder Composition P, a battery was prepared in the same manner as in Example 10, and charging and discharging of the battery were repeated. The electric capacity in the first charge was 17.9 mAh, and 17.0 mAh in the 10th charge (about 98% of that in the first charge).

From the results of Examples 10 to 12, it is apparent that binder compositions prepared by polymerizing monomer components, coagulating and drying the resulting elastomer to obtain a lumpy elastomer, pulverizing the elastomer, and dispersing the pulverized elastomer in an organic dispersion medium are also capable of giving a battery small in the drop in capacity upon charging and discharging, like the binder compositions of Examples 1 to 9.

Comparative Example 5

Binder Composition Q having a solid component concentration of 26% by weight was prepared in the same manner as in Example 10, except that ethyleneglycol dimethacrylate and divinylbenzene as crosslinking agents were not used, namely only 20 parts by weight of styrene, 10 parts by weight of methyl methacrylate, 80 parts by weight of n-butyl acrylate and 5 parts by weight of acrylic were used as monomer components. The polymer in the Binder Composition Q had a mean particle diameter of 0.73 μm and a gel content of 15%.

Using the Binder Composition Q, a battery was prepared in the same manner as in Example 10, and charging and discharging thereof were repeated. The electric capacity in the first charge was 9.7 mAh.

Example 13

One hundred parts by weight of isopropyl alcohol was charged into a reaction vessel and kept at 80° C., into which were dropwise added 10 parts by weight of styrene, 70 parts by weight of methyl methacrylate, 20 parts by weight of methacrylic acid, 4 parts by weight of 2,2-azobis-2,4-dimethylvaleronitrile and 12.5 parts by weight of toluene at a constant speed over a period of 4 hours. The resulting mixture was kept hot at 80° C. for an additional 2 hours.

The reaction vessel was cooled to 25° C., and a small quantity of sample was taken out for measurement of acid value. Then, the content of the reaction vessel was neutralized with aqueous ammonia (ammonia concentration 28%), after which 400 parts by weight of water was added. The mixture thus obtained was heated at 90° C. while distilling off the isopropyl alcohol and excessive quantity of water. Thus, an aqueous resin composition having a solid component concentration of 25% by weight was obtained. The resin in the composition had an acid value of about 130 and a weight average molecular weight of about 3,000.

A reaction vessel equipped with a stirrer was charged with 70 parts by weight of water, 80 parts by weight of the aqueous resin composition obtained above, 0.5 part by weight of sodium ethylenediamine tetra-acetate, 0.02 part by weight of potassium persulfate, 30 parts by weight of butadiene, 35 parts by weight of styrene, 35 parts by weight of methyl methacrylate and 0.7 part by weight of tertiary dodecylmercaptan. While stirring the mixture at 60° C., an emulsion polymerization was carried out until conversion of the monomers to polymer had reached 98% by weight. Then, the unreacted monomers were distilled off at 60° C. under a reduced pressure of 100 mmHg for 30 minutes to obtain a latex composition having a solid component concentration of 45% by weight. Then, 400 parts by weight of N-methylpyrrolidone was added to 100 parts by weight of the latex composition, and water was removed by means of a rotary evaporator to obtain Binder Composition R having a solid component concentration of 10% by weight. The polymer dispersed in the binder composition had a mean particle diameter of 0.23 μm and a gel content of 97%.

To 100 parts by weight of the binder composition obtained above was added 90 parts by weight of carbon (KS-15, manufactured by LONZA G+T Ltd.) as a negative electrode active material, and the mixture was homogenized with stirring to obtain a uniform slurry composition for negative electrode. The slurry composition was coated onto a copper foil of 0.2 mm thick, dried at 130° C. for 3 hours and pressed by means of a roll press to form a uniform layer having a thickness of 0.7 mm. Thus, a negative electrode was obtained.

On the other hand, a uniform slurry composition for positive electrode was prepared by stirring 10 parts by weight of polyvinylidene fluoride, 100 parts by weight of N-methylpyrrolidone and 90 parts by weight of lithium cobaltate. The composition thus obtained was coated onto an aluminum foil of 0.05 mm thick, dried at 130° C. for 5 hours, and pressed by means of a roll press to form a uniform layer having a thickness of 0.7 mm. Thus, a positive electrode was obtained.

Using the positive and negative electrodes obtained above, a battery was prepared in the same manner as in Example 1, and charging and discharging thereof were repeated. As a result, the electric capacity was 24.3 mAh in the first charge, 23.9 mAh in the 10th charge (about 98% of that in the first charge), 21.2 mAh in the 50th charge (about 87% of that in the first charge), and 20.1 mAh in the 10th charge (about 83% of that in the first charge). Thus, a battery having a high initial capacity was obtained.

The results mentioned above are summarized in the following Tables 1 and 2.

TABLE 1

| | First component | | Second component | | | | | | | |
| --- | --- | --- | --- | --- | --- | --- | --- | --- | --- | --- |
| | | | Carboxylic acid type | | | | | | Crosslinking agent | |
| | Conjugated | Carboxylic | Carboxylic | Monocarboxylic | Dicarboxylic acid | | | Nitrile group- | | |
| | diene type | ester type | ester type | acid | Itaconic | Fumaric | Styrene type | containing type | Divinyl- | |
| | Butadiene | BuA | MMA | Acrylic acid | acid | acid | Styrene | Acrylonitrile | benzene | EGdMA |
| Example 1 | 600 | | 400 | | 50 | | 800 | 100 | | |
| Example 2 | 500 | | 300 | | | | 1000 | 100 | | |
| Example 3 | 400 | | 400 | | 200 | 10 | 700 | 200 | | |
| Example 4 | 500 | | 400 | | 100 | | 800 | 100 | | |
| Example 5 | 600 | | 400 | | 50 | | 800 | 100 | | |
| Example 6 | 600 | | 20 | | | | 800 | | | |
| Example 7 | 150 | | 600 | | | | 800 | | 40 | |
| Example 8 | 600 | | 400 | | 50 | | 800 | 100 | | |
| Example 9 | 600 | | | | | | | | | |
| Comparative Example 1 | 600 | | 400 | | 50 | | 800 | 100 | | |
| Comparative Example 2 | 600 | | | | 50 | | 800 | 100 | 40 | |
| Comparative Example 3 | 600 | | 400 | | 50 | | 800 | 100 | | |
| Comparative | 600 | | 400 | | 50 | | 800 | 100 | | |

TABLE 1-continued

Example 4

|  | Particle diameter (μm) | Solid component concentration (% by wt.) | Dispersion medium | Boiling point of dispersion medium (° C.) | Gel content (%) | Evaluation (mAh) | | | |
|---|---|---|---|---|---|---|---|---|---|
|  |  |  |  |  |  | First | 10th | 50th | 200th |
| Example 1 | 0.14 | 37 | NMP | 204 | 95 | 19.6 | 19.2 (98%) | 17.8 (91%) | 17.5 (89%) |
| Example 2 | 0.15 | 40 | NMP | 204 | 92 | 19.0 | 18.7 (98%) | 17.2 (91%) | 16.8 (88%) |
| Example 3 | 0.14 | 42 | NMP | 204 | 95 | 18.6 |  | 17.4 (94%) | 17.0 (91%) |
| Example 4 | 0.2 | 7 | NMP | 204 | 98 | 20.0 |  | 19.0 (95%) | 18.6 (93%) |
| Example 5 | 0.14 | 6 | NMP | 204 | 96 | 19.8 |  | 18.4 (93%) | 17.8 (90%) |
| Example 6 | 0.12 | 11 | Benzene | 80.1 | 89 | 19.5 |  | 18.6 (95%) | 17.9 (92%) |
| Example 7 | 0.25 | 21 | NMP | 204 | 95 | 19.1 |  | 17.8 (93%) | 17.2 (90%) |
| Example 8 | 0.14 | 29 | Methyl lactate | 145 | 95 | 19.4 | 19.4 (100%) | 18.1 (93%) | 17.4 (90%) |
| Example 9 | 0.20 | 15 | Methyl lactate | 145 | 99 | 22.2 | 29.0 (98%) | 21.1 (95%) | 20.1 (91%) |
| Comparative Example 1 | 0.14 | 45 | Water | 100 | 95 | 17.4 | 16.2 (93%) | 15.9 (91%) | 14.8 (85%) |
| Comparative Example 2 | 0.21 | 33 | Water | 100 | 97 | 17.2 |  | 14.5 (84%) | 12.2 (71%) |
| Comparative Example 3 | 0.14 | 48 | Ethanol | 79 | 98 | Electrod not formable | | | |
| Comparative Example 4 | 0.14 | 45 | Water | 100 | 95 | 16.9 | 15.8 (94%) | 15.4 (91%) | 14.2 (84%) |

TABLE 2

| | First component | Second component | | | | | | | |
|---|---|---|---|---|---|---|---|---|---|
| | | Carboxylic acid type | | | | | | Cross-linking agent | |
| | Conjugated diene type Butadiene | Carboxylic ester type BuA | Carboxylic ester type MMA | Monocarboxylic acid Acrylic acid | Dicarboxylic acid Itaconic acid | Fumaric acid | Styrene type Styrene | Nitrile group-containing type Acrylonitrile | Divinyl-benzene | EGdMA |
| Example 10 |  | 50 | 10 | 5 |  |  |  | 20 |  | 3 |
| Example 11 |  | 30 | 10 | 5 |  |  |  | 20 | 13 | 3 |
| Example 12 |  | 80 | 10 | 5 |  |  |  | 20 | 13 | 3 |
| Example 13 | 30 |  | 35 |  |  |  |  | 35 |  |  |
| Comparative Example 5 |  | 80 | 10 | 5 |  |  |  | 20 |  |  |

|  | Particle diameter (μm) | Solid component concentration (% by wt.) | Dispersion medium | Boiling point of dispersion medium (° C.) | Gel content (%) | Evaluation (mAh) | | | |
|---|---|---|---|---|---|---|---|---|---|
|  |  |  |  |  |  | First | 10th | 50th | 200th |
| Example 10 | 0.3 | 15 | Ethylcyclohexane | 130~132 | 80 | 17.8 | 17.3 (97%) | | |
| Example 11 | 0.3 | 15 | NMP | 204 | 85 | 22.8 | 22.3 (98%) | | |
| Example 12 | 0.45 | 28 | Ethylcyclohexane | 130~132 | 88 | 17.9 | 17.0 (98%) | | |
| Example 13 | 0.23 | 10 | NMP | 204 | 97 | 24.3 | 23.9 (98%) | 21.2 (87%) | 20.1 (83%) |
| Comparative Example 5 | 0.73 | 26 | Ethylcyclohexane | 130~132 | 15 | 9.7 | | | |

In the tables, meanings of the abbreviations are as follows:

MMA: Methyl methacrylate

BuA: n-Butyl acrylate

EGdMA: Ethyleneglycol dimethacrylate

NMP: N-Methylpyrrolidone

It is apparent from the results of Examples 1 to 13 and Comparative Examples 1 to 5 that some of the batteries using aqueous binder composition have a low initial capacity and show a great drop in electric capacity upon charging and discharging. In cases where an organic solvent of which boiling point is lower than 80° C. is used, even formation of electrode is impossible, though the formulation of monomer mixture is just the same as in Example 1.

Industrial Utilizability

The elastomer dispersion composition of the present invention are successfully usable as, for instance, a binder composition for batteries. When it is used, the initial capacity of battery can be made high, and the active material is not readily released even if charging and discharging are repeated, and therefore a battery showing a small drop in capacity can be produced.

What is claimed is:

1. A composition comprising:

an electrode active material in an amount 5 to 1,000 times as much as an amount of polymer for use in achieving electrical capacity in batteries, the polymer having a gel content of 50% or more; and an organic dispersion medium of which the boiling point at 760 mmHg is 80° C. or above, said organic dispersion medium having said electrode active material and said polymer dispersed therein.

2. A composition according to claim 1, wherein said polymer is a polymer obtained by polyermizing at least a monomer component giving an elastomer when converted to a homopolymer, as a monomer component thereof.

3. A composition according to claim 1, wherein said polymer additionally contains an ethylenically unsaturated monomer unit, provided that ethylenically unsaturated monomer units giving an elastomer when converted to a homopolymer are excepted, as a second component, and the ratio by weight of a monomer unit giving an elastomer when converted to a homopolymer to the second component monomer unit is in the range of from 1:0.1 to 1:10.

4. A composition according to claim 1, wherein said polymer has a gel content of 75% or more.

5. A composition according to claim 1 which additionally contains a viscosity regulator.

6. An electrode obtained by coating a composition according to any one of claims 1 to 5 onto an electrode base, removing the organic dispersion medium and fixing the electrode active material.

7. A battery using an electrode according to claim 6 as at least one of a positive electrode and a negative electrode.

8. A battery using a non-aqueous electrolyte and using an electrode according to claim 6 as at least one of a positive electrode and a negative electrode.

9. A lithium type battery using an electrode according to claim 6 as at least one of a positive electrode and a negative electrode.

* * * * *